June 27, 1944.  N. KRAFT  2,352,210
CHEESE FORMING METHOD AND APPARATUS
Filed Nov. 13, 1941  5 Sheets-Sheet 1

Inventor:
Norman Kraft
By Soans, Pond & Anderson
Attys.

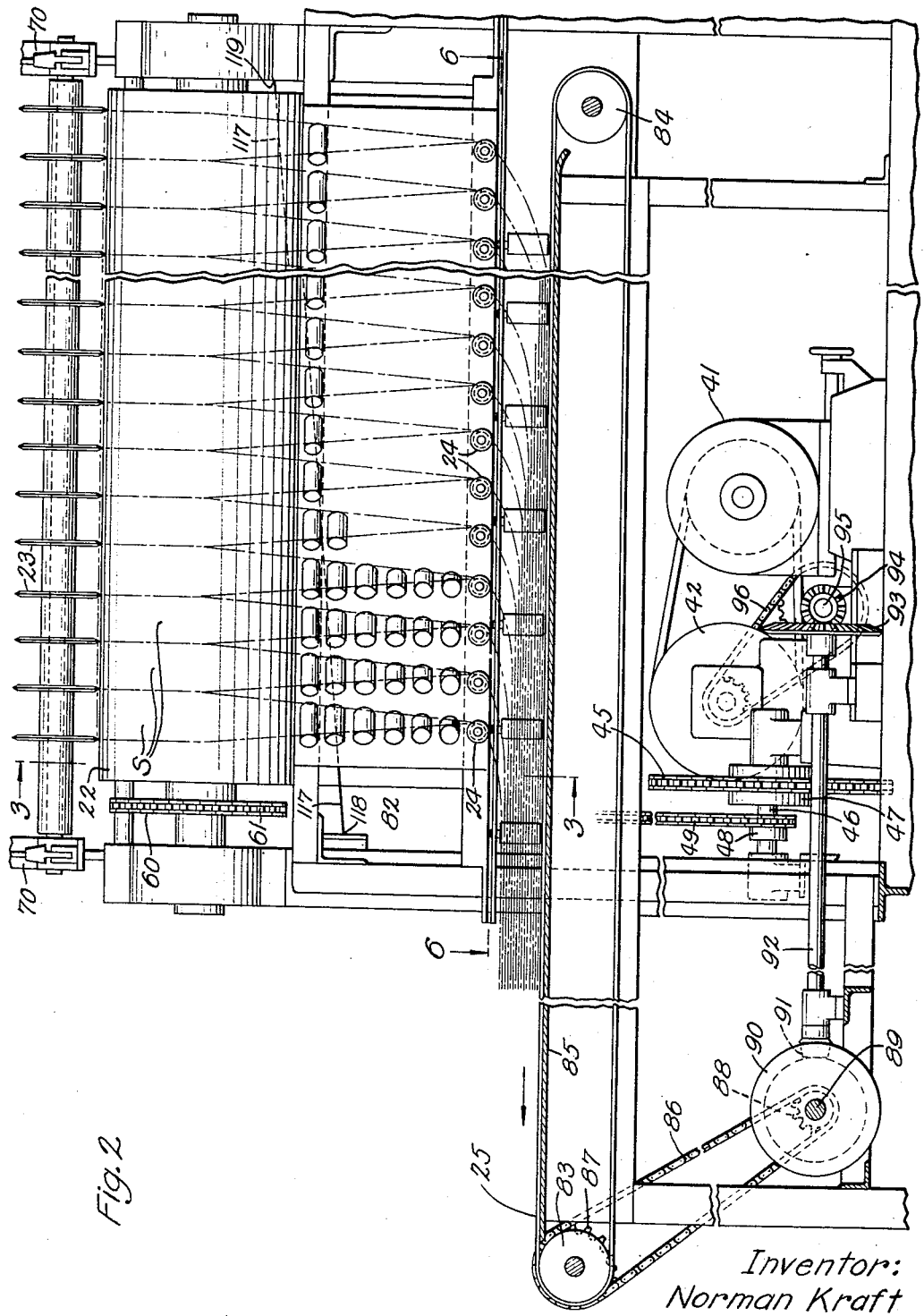

June 27, 1944.   N. KRAFT   2,352,210
CHEESE FORMING METHOD AND APPARATUS
Filed Nov. 13, 1941   5 Sheets-Sheet 3
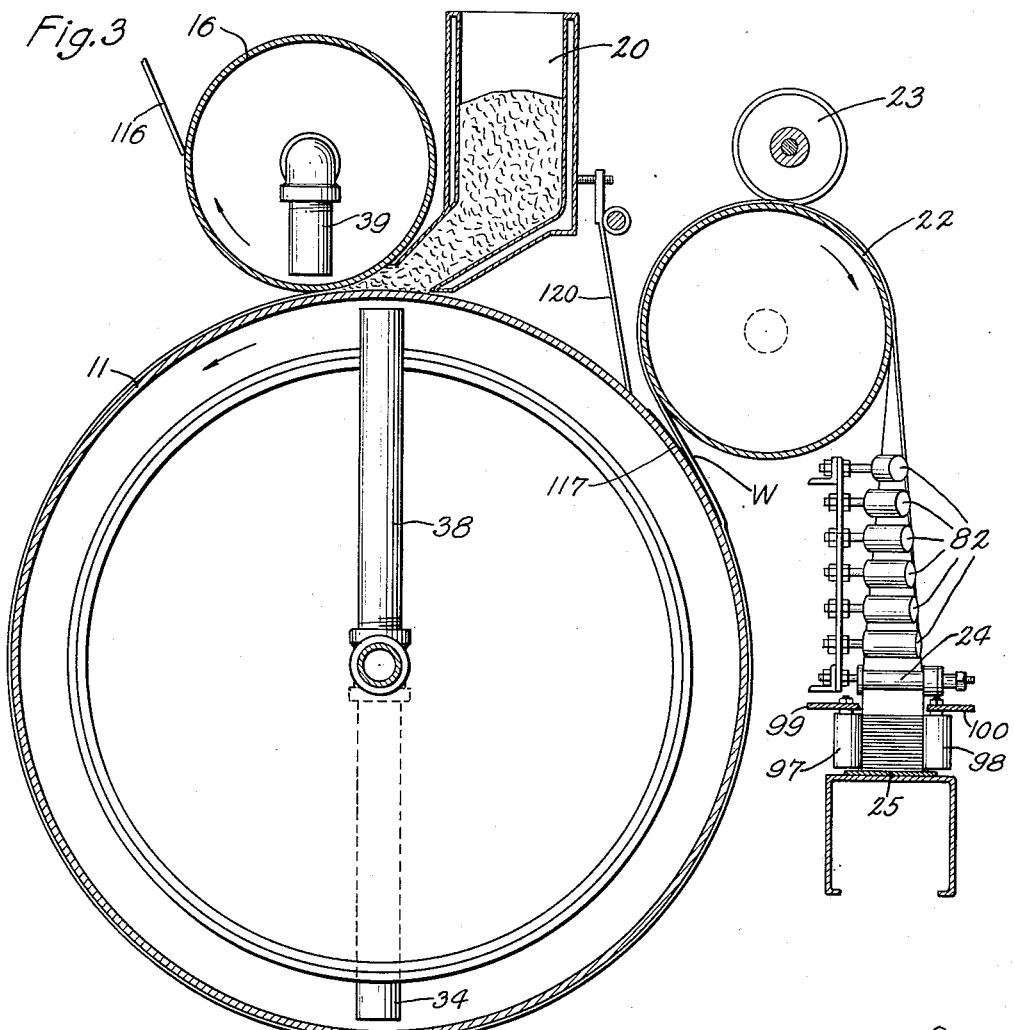
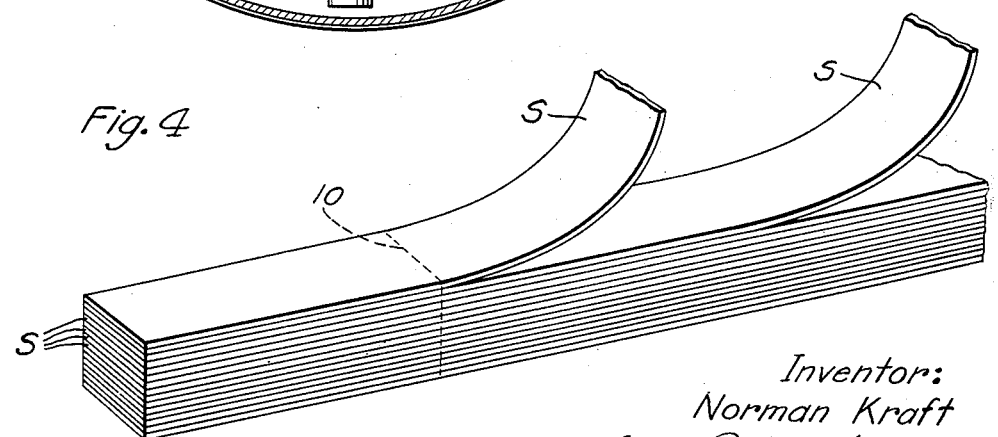
Inventor:
Norman Kraft
By Evans, Paul & Anderson
Attys.

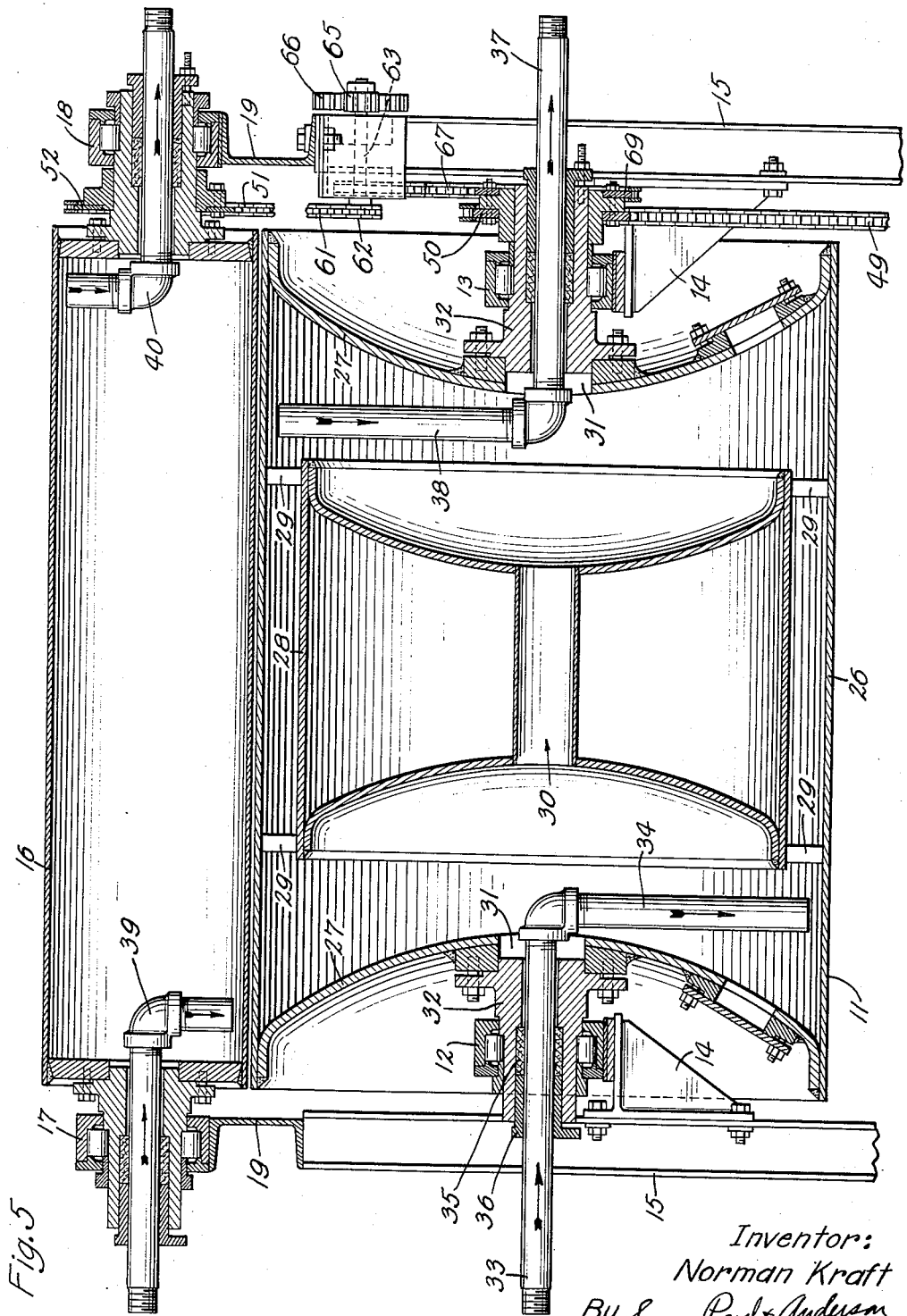

June 27, 1944.  N. KRAFT  2,352,210
CHEESE FORMING METHOD AND APPARATUS
Filed Nov. 13, 1941  5 Sheets-Sheet 5
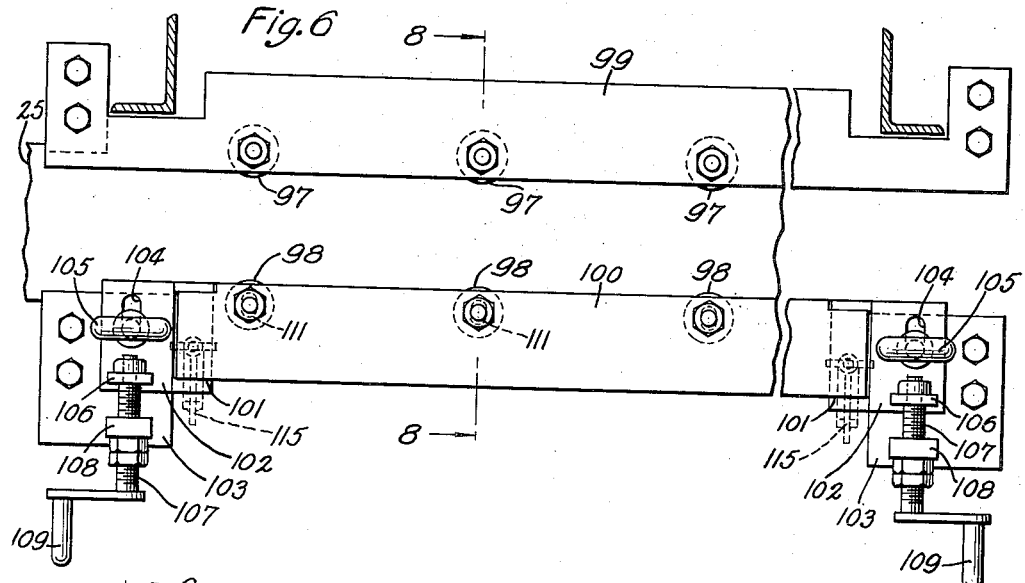
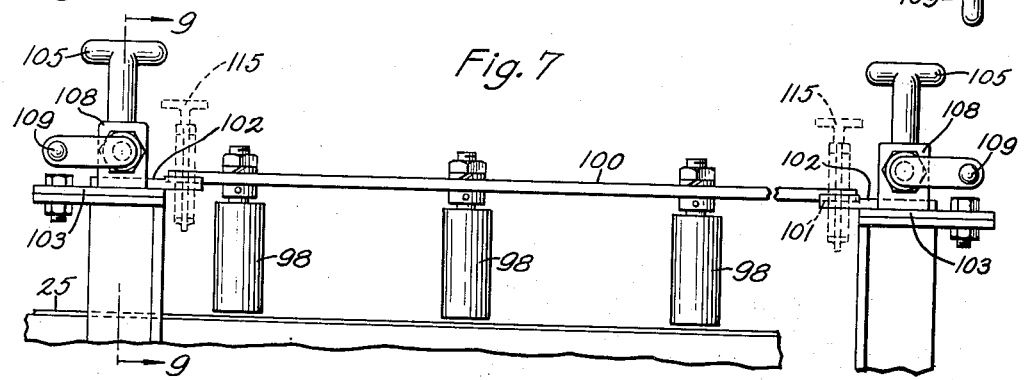
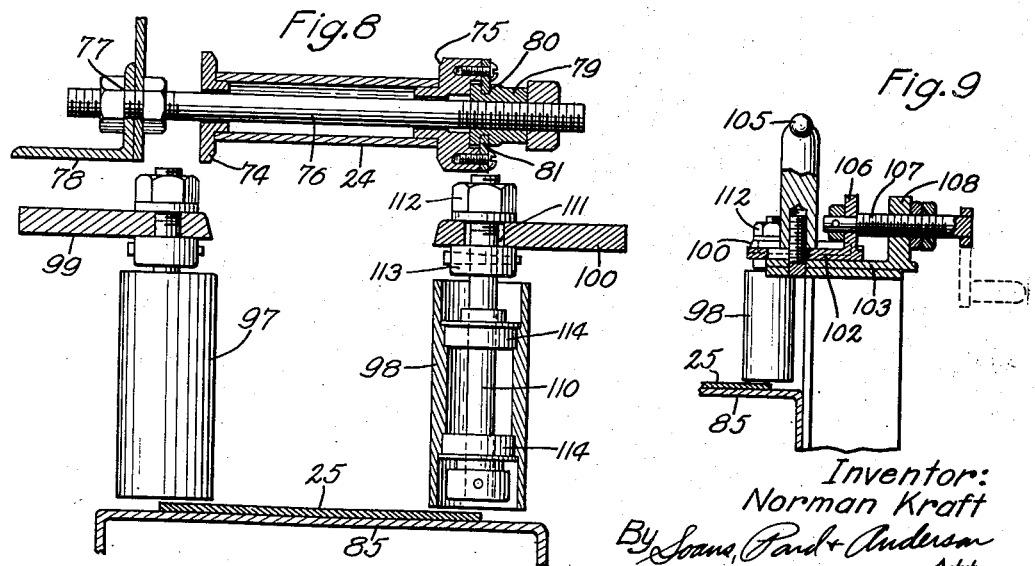
Inventor:
Norman Kraft
By Soans, Pond & Anderson
Attys.

Patented June 27, 1944

2,352,210

UNITED STATES PATENT OFFICE 2,352,210

CHEESE FORMING METHOD AND APPARATUS

Norman Kraft, Chicago, Ill., assignor to Kraft Cheese Company, a corporation of Delaware Application November 13, 1941, Serial No. 418,953

17 Claims. (Cl. 31—46)

This invention relates to improvements in cheese forming method and apparatus and it has particular reference to a method and apparatus for producing cheese in thin sheet or leaf form suitable for sandwich making or like purpose without further slicing of the thickness of the cheese.

The main objects of the invention are to provide a method and apparatus whereby thin sheet or leaf formed cheese of the character indicated may be produced efficiently, economically and with sufficient speed to make such cheese production commercially practicable; to provide a method and apparatus of the character indicated which will produce leaf form cheese and assemble a plurality of cheese leaves or sheets in relatively superposed relation for packaging purposes; and in general, it is the object of the invention to provide an improved method and apparatus of the character indicated.

Other objects and advantages of the invention will be understood by reference to the following specification and accompanying drawings (5 sheets) wherein there is disclosed a selected embodiment of the improved cheese forming method and apparatus.

In the drawings,

Fig. 2 is a front view of the apparatus, certain parts being shown in section.

Fig. 3 is a more or less diagrammatic cross-section on a plane represented by the line 3—3 on Fig. 2.

Fig. 4 is a perspective illustrating the method of assembling a plurality of cheese sheets or leaves.

Fig. 5 is a section on the line 5—5 of Fig. 1.

Fig. 6 is a section on the line 6—6 of Fig. 2.

Fig. 7 is a fragmentary side elevation of the mechanism indicated in Fig. 6.

Figure 1:
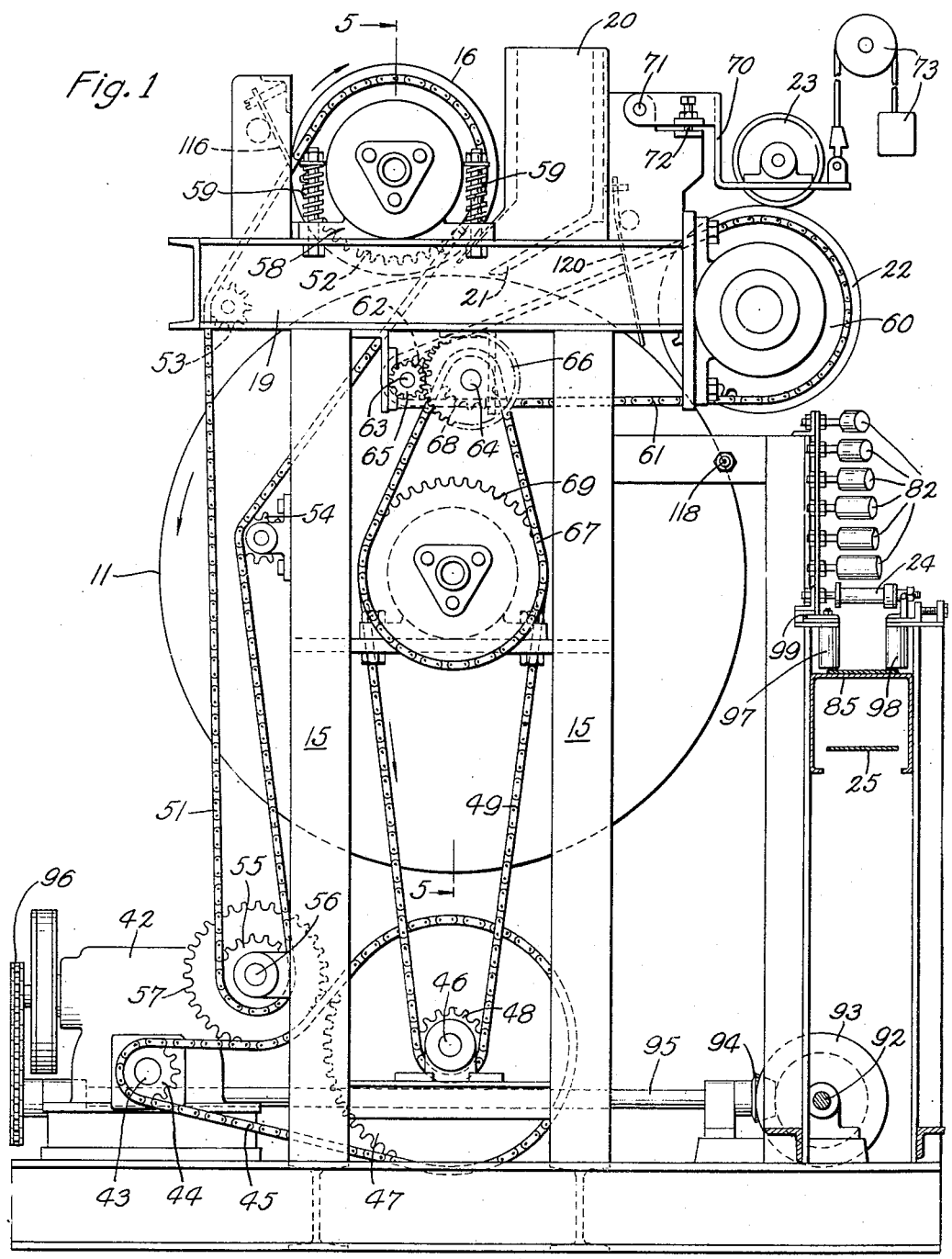
Fig. 1 is an end view of the improved apparatus, certain parts being shown in section.

Figs. 8 and 9 are sections on the lines 8—8 and 9—9 of Figs. 6 and 7 respectively.

General explanation

Referring now to the drawings, cheese, in sheet or leaf form is, according to the present method, formed into ribbon or web-like strips respectively designated S and the ribbons brought into relatively superposed face to face relation with their longitudinal side edges accurately registered. As shown in Fig. 4, a plurality of strips or ribbons, S when assembled in the manner stated, form a multi-ply, elongated bar or loaf of cheese which may be cut transversely as indicated by the dotted line 10 in Fig. 4, to form a commercially packagable loaf of sheet form cheese. By way of example, it has been found practical to package cheese in sheet form in five pound loaves, the sheets having a thickness of about one-sixteenth of an inch. Obviously, loaves of other weights and of sheets of other thicknesses may of course be produced but it is desirable that the thickness in any event be such that the cheese sheets are ready for use merely upon separation from the assembly of sheets and without slicing the thickness thereof.

The improved apparatus herein shown for producing the described sheet formed cheese comprises a drum 11, the same being journalled for rotation in suitable roller bearings 12 and 13 which are respectively supported by brackets such as indicated at 14 carried by a suitable frame structure embodying angle or channel iron members such as indicated at 15.

Above the drum 11 there is provided a roll 16 which is journalled in suitable anti-friction bearings 17 and 18 which are respectively supported by suitable brackets mounted on frame members such as indicated at 19.

Cheese, preferably process cheese in molten or fluid form, is delivered from the processing apparatus to a hopper or head box 20 which is suitably supported on the frame members 19. Said hopper 20 is provided with a downwardly inclined outlet spout or nozzle 21 which delivers the molten or fluid cheese into the nip or bight of the roll 16 and drum 11 which are rotated in such direction that cheese is rolled out between them into a thin sheet which is caused to follow the drum 11.

From the drum 11, the thin sheet or web of cheese indicated at W (Fig. 3) is delivered to another roll 22. The cheese web travels upwardly over and downwardly from the roll 22 and while on said roll is slitted into a plurality of parallel ribbons or strips S by means of a series of circular slitting knives 23.

The ribbons S of cheese are guided from the roll 22 downwardly and respectively over a spool or guide 24 which serves to twist each ribbon of cheese through an angle of 90 degrees. The cheese ribbons pass around and under the respective spools 24 and are delivered to a conveyor 25 which carries the cheese forwardly for any desired packaging or other operations.

Detailed explanation

The drum 11 is a hollow structure as best shown in Fig. 5 embodying a cylindrical shell 26 and inwardly concave ends or heads 27. Within the hollow drum there is also provided a hollow filler drum 28 which is of generally the same construction as the main drum 11, said drum being suitably supported in co-axial relation to the drum 11 by spacers such as indicated at 29 which serve to maintain the drum 28 in fixed spaced relation around its entire circumference to the inside of the drum 26. A central opening such as indicated at 30 may be provided through the drum 28 if it is desired. The ends 27 of the outer drum 11 may be welded or otherwise secured to the cylindrical shell 26 but it is preferred that whatever fastening means is employed be such that the outer surface of the drum 11 can be finished off smoothly with a high polish over its entire area.

Each head 27 is centrally apertured as shown at 31 and has attached to it in co-axial relation to the axial aperture 31 a stuffing box member 32. Said stuffing box member 32 is so formed as to provide a bearing surface for cooperation with the anti-friction bearings 12 and 13 for rotatably supporting the drum 11. A normally stationary inlet pipe 33 for cold water or other chilling medium passes through the stuffing box member 32 and into the drum 11 wherein it is provided with a downwardly extending discharge end 34 which terminates in close proximity to the lower portion of the drum. Leakage of the cooling fluid from within the drum around the inlet pipe 33 is prevented by means of packing 35 and a packing gland 36 which cooperate with the stuffing box member 32 to permit rotation of the drum 11 around the inlet pipe 13 without permitting leakage of the cooling fluid as stated. At the opposite end of the drum 11, an outlet pipe 37 emerges from within the drum through the stuffing box member 32 which cooperates with packing and a packing gland to prevent leakage of the cooling fluid around said outlet pipe 37. Within the drum 11 the outlet pipe 37 has an upward extension 38 which terminates closely adjacent the uppermost portion of the drum so as to insure substantially complete filling of the drum with the cooling medium before permitting the escape from the drum of any such cooling medium through the outlet 37. The inner drum 28 is employed so as to reduce the required volume of cooling fluid and so as to eliminate from the total weight of the apparatus, the weight of the displaced volume of the cooling medium.

The cheese pressing roller 16 is rotatably mounted as best shown in Fig. 5 in the bearings 17 and 18 in substantially the same manner as the drum 11 is mounted in the bearings 12 and 13. A cooling fluid inlet pipe 39 enters one end of the roll 16 and an outlet pipe 40 emerges from the other end, provision such as already explained in connection with the drum 11 being provided for maintaining a substantially complete fill of the cooling medium in the roll 16.

The drum 11 is driven at the desired speed of rotation by means of an electric motor 41 (Fig. 2) which drives a suitable speed reducing unit 42. The driven or output shaft 43 of the speed reducing unit is provided with a sprocket 44 and a chain 45 transmits rotation from the shaft 43 to a shaft 46 by engagement of the said sprocket 44 and a sprocket 47 secured to said shaft 46. The shaft 46 is suitably journalled in bearings carried by frame parts and said shaft has secured to it a sprocket 48 which is engaged by a chain 49, the latter extending upwardly into engagement with a sprocket 50 which is suitably secured to a part of the stuffing box member 32 (see Fig. 5).

The roll 16 is driven by means of a chain 51 which engages a sprocket 52 suitably secured to the roll (see Fig. 5), said chain also engaging suitable guide sprockets 53 and 54 and a sprocket 55. The sprocket 55 is secured to a shaft 56 which also has secured to it a sprocket 57 which engages the chain 45 so as to receive driving rotation therefrom.

The trough or head box 20 is preferably of a jacketed construction as indicated more or less diagrammatically in Fig. 3 so that the supply of molten cheese delivered thereto may be maintained at the desired temperature to insure its workability between the roll 16 and drum 11. Suitable means may also be provided in the trough 20 to control the size of the outlet opening therefrom both in respect to its length and width so as to thereby facilitate regulation of the volume of molten cheese delivered to the roll 16 and drum 11. Inasmuch as such regulating features form no part of the present invention, the details thereof are not herein illustrated.

As best shown in Fig. 1, the brackets 58 which rotatably support the roll 16 at each end are held in place on the frame members 19 by suitable spring means indicated at 59 which will yield and permit the roll 16 to be displaced upwardly in the event that incompressible foreign material or object comes between the roll and drum.

The roll 22 may be of simple hollow or solid form (preferably hollow for light weight) and it is driven at a surface speed which is substantially equal to the surface speed of the drum 11, as is also the roll 16. For driving the roll 22, it has suitably secured to it a sprocket 60 for engagement by a chain 61 which also engages a sprocket 62 which is carried by a shaft 63 suitably journalled in bearings carried by the frame structure. The shaft 63 is driven from a shaft 64 by means of inter-meshing gears 65 and 66 carried respectively by said shafts. The shaft 64 is driven by means of a chain 67 which engages a suitable sprocket 68 secured to the shaft and a sprocket 69 which is directly connected to the driven sprocket 50 as best shown in Fig. 5.

The slitters 23 will rotate automatically as an incident to their frictional engagement with the roll 22 and with the cheese sheet which travels with the roll 22. Said slitters 23 are carried by a shaft which is journalled in suitable bearings carried by pivotally mounted arms such as indicated at 70, the same being pivotally mounted as shown at 71 on a conveniently accessible frame part or bracket provided for that purpose and adjustably supported in predetermined relation to the surface of the roll 22 by means of adjustably set screws or the like, such as indicated at 72. To facilitate threading of the cheese sheet around the roll 22, cleaning of the apparatus and other operations about the machine, the slitters 23 may be swung to an upwardly disposed position about the pivots 71 and a suitable counterweight arrangement indicated at 73 is provided for facilitating such upward displacement. Said counterweight arrangement also serves to relieve the adjustable supporting means 72 of the need for supporting much of the weight of the slitter structure and thereby facilitates accurate adjustment of the relationship of the slitters 23 to the surface of the roll 22 so as to prevent actual contact between said slitters and roll, while at the same time providing for their coming into very close relationship to each other.

The spools or guides 24 each serve to effect twisting of a cheese ribbon and also to guide the ribbon accurately into predetermined position on the conveyor 25 so as to secure accurate registry of the side edges of the various cheese ribbons when deposited in superposed relation on said conveyor.

Each of said spools 24 embody end flanges 74 and 75 which are provided with suitably apertured hubs for rotatably mounting the spool on a shaft or pintle 76. The pintles 76 are fixedly mounted as indicated at 77 in a suitable supporting frame part 78 and the outer ends of said pintles are provided with screw threading for adjustably receiving suitable nuts such as indicated at 79. Each nut 79 is circumferentially grooved as shown at 80 to receive an inwardly extending flange or lip 81 which is carried by the end member 75 of the spool. By reason of the described connection between the nut 79 and spool, it will be apparent that the spool may be adjusted inwardly or outwardly on the shaft 76 by suitably adjusting the nut 79 thereon, and also that the spool may rotate freely relative to the nut 79 while the latter remains in selected position of adjustment. The nut 79 may be a tight-fit on the screw threading which it engages so as to avoid a tendency for the nut to rotate under the influence of the normally rotating spool 24 or, if preferred, any other desirable locking arrangement for positively preventing accidental turning of the nut may be provided.

Intermediate the roll 22 and the flanged guide spool 24 there may be provided sets of rolls or spools such as indicated at 82 which are arranged in progressively increasing angles to the normal plane of the cheese web coming from the roll 22 so as to thereby effectively guide the twisting of the cheese ribbons. The intermediate spool sets 82 are probably not essential but they may serve to prevent undesirable wavering of the respective cheese ribbons during the course of travel thereof between the roll 22 and the respective spools 24.

The conveyor 25 may be of a simple belt form, the upper reach of which is preferably supported intermediate its guide rolls 83 and 84 by means of a flat plate-like member 85 which is suitably supported by connection to frame structure provided for that purpose. The guide rolls 83 and 84 are supported by shafts journalled in bearing brackets carried by the frame structure and one of said guide rolls may be driven by means of a chain 86 which engages a sprocket 87 carried by the shaft of the roll 83 and a sprocket 88 carried by a shaft 89 suitably journalled in supporting brackets or the like carried by appropriate frame structure. The shaft 89 may be driven by a pair of intermeshing bevel gears 90 and 91 respectively carried by the shaft 89 and a suitably journalled shaft 92. The shaft 92 is in turn driven by means of a pair of intermeshing bevel gears 93 and 94, the gear 93 being secured to the shaft 92 and the gear 94 being secured to a shaft 95 which is chain-driven as indicated at 96 by connection to the input shaft of the speed reducer 42.

To insure accurate registration of the edges of the cheese ribbons as they are delivered in superposed relation on the conveyor 25, there is provided adjacent the opposite sides of the conveyor belt 25 sets of axially vertical guide rolls 97 and 98. Said guide rolls 97 and 98 are supported by means of horizontally extending plates or bars 99 and 100, the supporting plate 99 being preferably fixedly mounted on suitable frame-carried brackets provided for that purpose.

The supporting plate 100 for the guide rolls 98 is preferably mounted for adjustment toward and from the inwardly disposed set of guide rolls 97 and for this purpose the opposite ends of the plate 100 are seated in recesses indicated at 101 provided in brackets 102 which are in turn seated on the flat top surface of supporting plates or brackets 103 carried by the frame structure. Said brackets 102 are provided with slots 104 and clamping screws 105 pass through said slots and threadedly engage the underlying supporting bracket portions 103. Said clamping screws 105, when tightened, serve to lock the brackets 102 in the selected position of adjustment. To facilitate lateral adjustment of the brackets 102, each bracket is provided with an upstanding lug or ear 106, to which there is rotatably secured the end of an adjusting screw 107. Said adjusting screw threadedly engages a suitably tapped opening in an upstanding lug 108 carried by the supporting bracket 103 and the outer end of each screw 107 is provided with a crank handle 109 whereby the screw may be easily turned to whatever extent may be desired. It will be seen that by rotating the screw 107, it will move inwardly or outwardly relative to the stationary supporting bracket 103 and will correspondingly move the slidable member 102 together with the plate 100 inwardly or outwardly.

The rollers 97 and 98 may also be individually adjustably mounted for movement toward and from each other, i. e., transversely of the path of travel of the conveyor 25, but it has been found sufficient for practical purposes to so mount the guide rollers 98 on the plate 100. Accordingly, the guide rollers 98 have their shafts 110 passed through elongated slots 111 in the plate 100, whereby the rollers may be adjusted inwardly or outwardly as may be desired. As best shown in Fig. 8, the rollers may be clamped in adjusted position by means of a clamping nut 112 threadedly fitted on the upper end of the shaft 110 and cooperating with a collar 113 which is secured in fixed position on the shaft 110. The rollers 97 and 98 are preferably mounted on the shaft 110 through the agency of suitable free-running anti-friction roller or other bearings indicated generally at 114.

If desired, the plate 100 may be screwed or clamped to the bracket 102, clamps 115 being indicated in dotted lines for this purpose. It is preferred, however, that the plate 100 be detachably mounted so as to facilitate removal thereof, thereby to provide free access to the conveyor for cleaning and other purposes.

When molten cheese is delivered into the bight of the drum 11 and roll 16, the cheese will be rolled out into a thin sheet on the surface of the drum 11. The temperature of the roll 16 and drum 11 is maintained at a sufficiently low point that the cheese sheet will be sufficiently set as it emerges from between the roll 16 and drum 11 to be self-sustaining in sheet form, corresponding in thickness to the space between the roll 16 and drum 11. During the relatively long path of travel of the cheese sheet around the drum 11, it becomes more completely set so that by the time it is transferred to the slitter roll 22, it is of adequate strength to avoid tearing and to insure the delivery of a continuous web of cheese to the roll 22. The quick chilling of the cheese in the manner indicated has the effect of producing a relatively non-porous, more or less calendered surface on the cheese sheet. Such a calendered or highly finished surface tends to prevent the superposed cheese ribbons from sticking together and it also aids in preserving the cheese in that it tends to resist the entrance of bacteria into the cheese during the time that the cheese travels on the conveyor 25 to suitable recutting and wrapping stations or apparatus.

Suitable means may be provided for cleaning from the surface of the roll 16 any cheese particles which may adhere thereto. Such means may be in the form of a blade 116 suitably mounted in the frame structure and caused to bear against the surface of the roll 16 as indicated in Figs. 1 and 3.

For separating the cheese web or sheet from the drum 11 for delivery to the slitter roll 22, there is preferably provided a wire 117 which extends transversely of the drum surface and is also disposed at an angle so as to extend in a minor degree circumferentially of the roll. One end of the wire 117 may be anchored as indicated at 118 in a frame part, and the other end may be suitably anchored at a point located slightly beyond an imaginary plane extending through the axes of the roll 22 and drum 11 substantially as indicated at 119 (Fig. 2). The wire 117 serves to effectively separate the cheese web from the surface of the drum 11 and leaves the said drum surface clean and in condition for further cooperation with the roll 16 in the continued formation of a cheese sheet. However, as a precautionary measure a further doctor blade 120 may be provided for engaging the surface of the drum 11 to remove therefrom any particles of cheese which may have escaped the wire 117. By this means a clean, smooth drum surface is always presented to the sheet-forming zone of the apparatus.

It will be apparent that the number of ribbons of cheese to be formed and delivered into superposed relation may correspond with the number of ribbons of cheese desired in a package. Thus, handling and special assembling operations are avoided and economy of production attained. It will be further observed that no manual handling of the cheese at any point in the formation of the cheese ribbons is required.

Various changes in the described structure may be made without departing from the spirit of the invention, the scope of which should be determined by reference to the following claims, the same being construed as broadly as possible consistent with the state of the art.

I claim:

1. The method of preparing cheese which consists in forming the cheese into a thin sheet, slitting the sheet into ribbons of predetermined width, guiding the ribbons into relatively superposed assembled relationship, and then cutting the assembled ribbons transversely to form a multi-ply loaf or brick of cheese.

2. The method of preparing cheese which consists in forming the cheese into a thin sheet, causing said sheet to travel in an edgewise direction, slitting the travelling sheet into a plurality of substantially co-planar ribbons, twisting the ribbons into substantially parallel relationship, guiding the parallel ribbons into face to face relation to form a multi-ply assembly of said cheese ribbons, and then transversely severing the assembly to form a multi-ply loaf or brick of cheese.

3. The method of preparing cheese which consists in forming the cheese into a thin sheet, causing said sheet to travel in an edgewise direction, slitting the travelling sheet into a plurality of substantially co-planar ribbons and causing the latter to continue the travel of the sheet in a downward direction, twisting the downwardly moving ribbons into substantially parallel relationship, changing the travel of the ribbons to a horizontal direction and guiding the ribbons into face to face relation to form a horizontally moving, multi-ply cheese ribbon assembly, and then transversely severing the assembly to form a multi-ply loaf or brick of cheese.

4. Apparatus of the class described comprising a drum, means adjacent an upper portion of said drum for forming on the surface of the drum a thin sheet of cheese, means for effecting rotation of said drum so as to propel said sheet of cheese downwardly from said sheet-forming means, means adjacent another upwardly disposed portion of the drum for removing said cheese sheet from the drum, and means for slitting the cheese sheet removed from the drum into a plurality of ribbons adapted to be assembled in superposed relation to form a multi-ply bar of cheese.

5. In apparatus of the class described the combination of an axially horizontal, rotatably mounted drum, means adjacent an upper portion of said drum for forming a cheese sheet thereon, means adjacent another upper portion of said drum for effecting removal of the cheese sheet from said drum, means for effecting rotation of said drum so as to carry said sheet downwardly from said sheet forming means and then upwardly to said sheet removing means, and means for chilling the cheese sheet on said drum during the course of its travel between said sheet-forming and removing means.

6. In apparatus of the class described the combination of an axially horizontal, rotatably mounted drum, means adjacent an upper portion of said drum for forming a cheese sheet thereon, means adjacent another upper portion of said drum for effecting removal of the cheese sheet from said drum, means for effecting rotation of said drum so as to carry said sheet downwardly from said sheet forming means and then upwardly to said sheet removing means, means for chilling the cheese sheet on said drum during the course of its travel between said sheet-forming and removing means, and means for acting on said removed cheese sheet to divide the same into a plurality of ribbons adapted to be superposed in face to face relation to form a multi-ply bar or brick of cheese.

7. In apparatus of the class described the combination of an axially horizontal, rotatably mounted drum, means adjacent an upper portion of said drum for forming a cheese sheet thereon, a roll adjacent another upper portion of said drum for effecting removal of the cheese sheet from said drum, means for effecting rotation of said drum so as to carry said sheet downwardly from said sheet-forming means and then upwardly to said sheet removing roll, means for chilling the cheese sheet on said drum during the course of its travel between said sheet-forming and removing means, means for acting on said removed cheese sheet to divide the same into a plurality of ribbons adapted to be superposed in face to face relation to form a multi-ply bar or brick of cheese, a plurality of slitters cooperating with said sheet removing drum to separate said sheet into a plurality of ribbons, and means for receiving the ribbons from said roll and guiding the same into relatively superposed face to face relation so as to form a multi-ply bar of cheese.

8. Apparatus according to claim 7 wherein said slitters comprise a plurality of discs mounted for movement toward and from said drum, and wherein there is provided adjustable means for supporting said discs in cooperative relation to said drum.

9. In apparatus for forming a cheese sheet, the combination of an axially horizontal, rotatably mounted drum, means for forming a cheese sheet on said drum, means for chilling the sheet formed on said drum so as to set said sheet, a wire extending longitudinally of said drum from end to end thereof and also circumferentially of the drum to a limited extent and in contact with the surface of said drum for skiving the cheese sheet from the drum, and means for receiving the sheet so removed from the drum and dividing the same into sections adapted to be assembled in relatively superposed relation to each other to form a multi-ply loaf or brick of cheese.

10. In apparatus of the class described, the combination of means for forming and propelling edgewise a thin sheet of cheese, means for dividing said sheet of cheese into a plurality of co-planar cheese ribbons, a plurality of guides extending transversely of the plane of said co-planar ribbons and respectively operative to engage said ribbons to effect twisting thereof into substantially parallel relation, and means for receiving the parallel ribbons from said guides and assembling the same in relatively superposed relation so as to form a multi-ply bar of cheese.

11. Apparatus of the class described comprising means for forming and propelling edgewise a thin sheet of cheese, means for slitting said sheet into a plurality of co-planar ribbons and for directing the same into an endwise downward path of travel, and a plurality of guides spaced downwardly from said directing means and extending in a direction transverse to the plane of said co-planar ribbons, said guide means being operative to engage said cheese ribbons to twist the same into substantially parallel relationship, and means for collecting said ribbons into a multi-ply cheese bar.

12. Apparatus of the class described comprising means for forming and propelling edgewise a thin sheet of cheese, means for slitting said sheet into a plurality of co-planar ribbons and for directing the same into an endwise downward path of travel, and a plurality of guide spools mounted for rotation about an axis extending transversely of the plane of said co-planar ribbons, said spools being operative to receive and twist said ribbons into substantially parallel relationship, and means for collecting said parallel ribbons into a multi-ply cheese bar.

13. Apparatus according to claim 12 wherein there is provided means for effecting axial adjustment of said guide spools.

14. Apparatus according to claim 12 wherein there is provided intermediate said directing means and each of said spools, a series of guide rolls operative to progressively twist the ribbons.

15. Apparatus according to claim 12 wherein the ribbon collecting means comprises a horizontally movable conveyor, and a series of axially vertical guide rolls adjacent one side of said conveyor for cooperating with said horizontal guide rolls to position the collected ribbons on said conveyor with their edges in registry.

16. Apparatus according to claim 12 wherein said ribbon collecting means comprises a horizontally movable conveyor, and a pair of sets of axially vertical guide rolls respectively disposed adjacent the opposite sides of said conveyor so as to cooperate therewith to form a trough for positioning the cheese ribbons in said relatively superposed, assembled relationship on the conveyor.

17. Apparatus according to claim 12 wherein said ribbon collecting means comprises a horizontally movable conveyor, a pair of sets of axially vertical guide rolls respectively disposed adjacent the opposite sides of said conveyor so as to cooperate therewith to form a trough for positioning the cheese ribbons in said relatively superposed, assembled relationship on the conveyor, and means for mounting one of said sets of guide rolls for adjustment toward and from the other set.

NORMAN KRAFT.